United States Patent Office 2,968,604
Patented Jan. 17, 1961

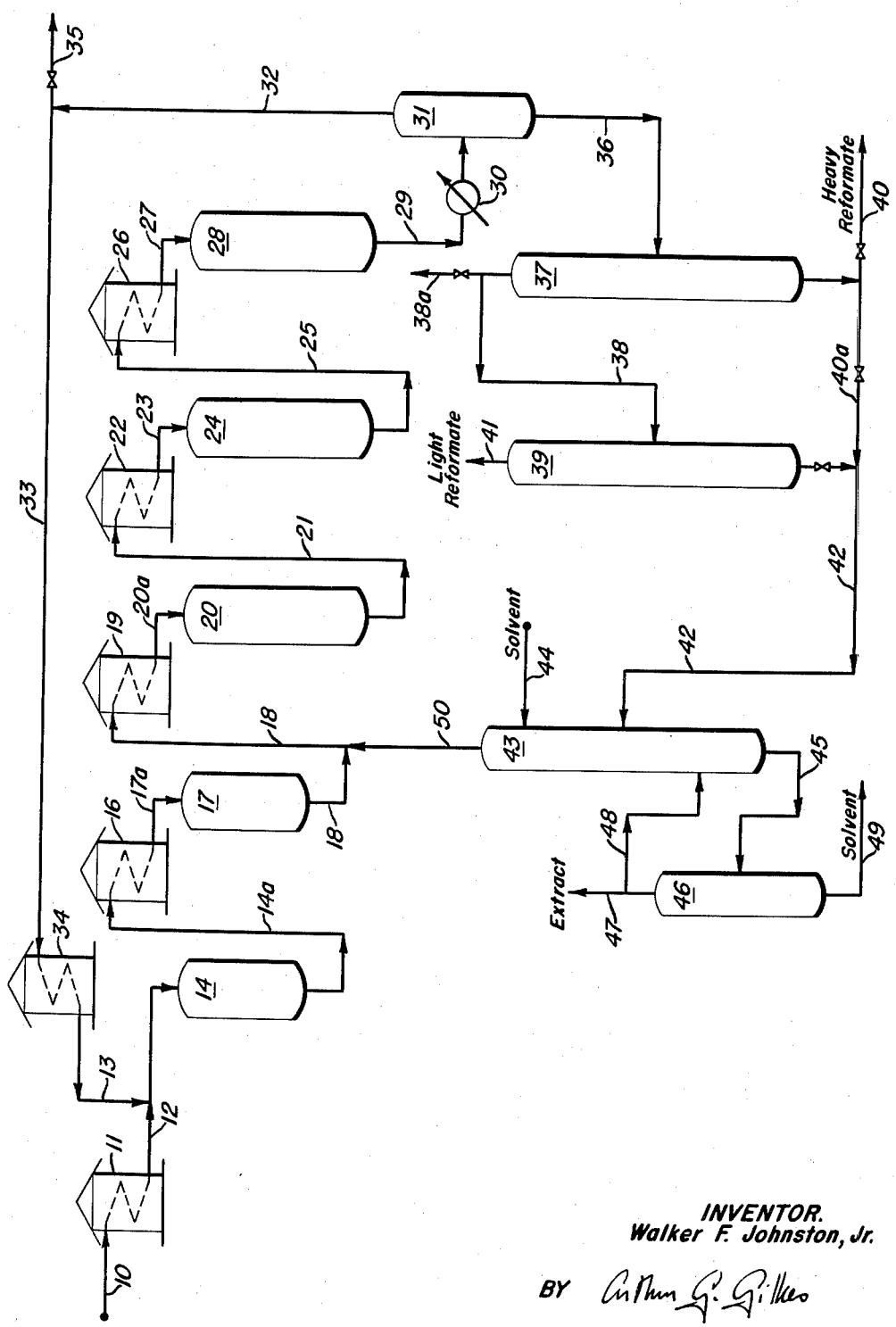

2,968,604

PROCESS FOR PRODUCTION OF HIGH OCTANE BLENDING STOCKS

Walker F. Johnston, Jr., La Marque, Tex., assignor to The American Oil Company, Texas City, Tex., a corporation of Texas Filed Nov. 13, 1956, Ser. No. 621,764

2 Claims. (Cl. 208—65)

My invention relates to the production of ultra high octane number blending stocks from ordinary naphtha feed stocks by a combined process of catalytic reforming and selective segregation and recycling of products.

The primary object of the invention is to provide means for relieving the economic pressure imposed on refiners by the high cost of producing incremental barrel octanes in the manufacture of gasoline at the 100+ CFRR octane number level. The present invention provides means whereby substantial savings in catalyst requirements for producing 100+ octane number stocks can be achieved and also provides means for maximizing the recoverable liquid yield of high octane product. The invention also provides means for attaining higher octane values than can be produced by conventional means from ordinary naphtha feeds, or, insofar as I am aware, by means that have been proposed for this purpose.

According to the invention, the feed is charged to a reforming zone in which at least three reactors connected in series are provided. The reactors are equipped in the usual manner for interheating between reactors in order to compensate for endothermic temperature drop and to introduce additional heat into the later stages of the reaction. The reactors contain a platinum type reforming catalyst in the form of pelleted, pilled or beaded particles. In the reforming zone, separate dehydrogenation and dehydrocyclization stages are readily identified by the relatively large endothermic temperature drop across the catalyst beds of the first one or two reactors encountering the charge. My invention contemplates treating the first reactors to be contacted by the feed as dehydrogenation reactors and the subsequent reactors as dehydrocyclization reactors.

The effluent from the reforming zone is separated conventionally into a recycle hydrogen gas fraction and a liquid reformate fraction. The latter, according to the invention, is further fractionated so as to separate light hydrocarbons boiling below the $C_6$ range and to recover a $C_6+$ fraction having an aromatics content suitable for further processing according to the invention. I prefer to operate the reforming zone at the highest severity consistent with economic use of the catalyst therein and recovery of ultimate product barrel-octanes. With a commercially available platinum-alumina catalyst as used in Ultraforming, for example, under reforming conditions including a pressure in the range of about 150 to 400 p.s.i.g., the severity level should be sufficient to produce at least a 95 CFRR $C_5+$ reformate from a Mid-Continent heavy naphtha charge, and more advantageously, such as to produce a 100+ CFRR $C_5+$ reformate. Then, according to the invention, the $C_6+$ reformate is split by fractionation into a fraction boiling in the range of about 150 to 280° F. and a heavy fraction having an initial boiling point in the range of about 220 to 275° F. which contains at least about 85 volume percent aromatics. The latter constitutes a product stream, having a clear octane number significantly in excess of 100 CFRR (extrapolated). The 150 to 280° F. cut is subjected to solvent extraction to separate an aromatics-rich cut, which may be blended with the before-mentioned heavy reformate cut, and an aromatics-lean cut. The aromatics-lean cut is recycled to the reforming zone by charging it to a reactor in the dehydrocyclization stage of the reforming zone along with the usual reaction mixture.

When the reforming severity is substantially less than that producing about 95 CFRR reformate, it may not be possible to cut out a heavy reformate fraction of high octane by simple fractionation. In this event, the entire $C_6+$ cut, which will then contain substantially less than 80 volume percent aromatics, is subjected to solvent extraction.

The invention will be further described by reference to the accompanying drawing which is a flow plan of a preferred embodiment of the invention in simplified diagrammatic form.

The feed, constituting a 200 to 400° F. mixture of South Texas naphthas, is charged to the system through line 10. The feed is preheated in fired heater 11 and is mixed in line 12 with recycle hydrogen gas from line 13. The mixture is charged to reactor 14, which is the first of a train of five serially connected reactors, each of which contains a bed of platinum-alumina catalyst in pellet form. The reaction mixture is flowed from reactor 14 via line 14a to interheater 16 and from thence via connection 17a to reactor 17. The effluent from reactor 17 is passed by means of line 18, into which recycle raffinate from line 50 is charged, through interheater 19 and from thence by means of connection 20a to reactor 20. From reactor 20, the reaction mixture is passed by means of line 21, interheater 22 and connection 23 to reactor 24. From reactor 24, the reaction mixture is passed by means of line 25, interheater 26 and connection 27 to the last reactor 28.

The effluent from the final reactor 28 is flowed through line 29 and cooler 30 to high pressure gas separator 31. In separator 31, a recycle gas rich in hydrogen is recovered by line 32 for recompression and recycle through line 33, heater 34 and line 13. Excess make gas may be vented from the system through valved connection 35.

The liquid fraction separating in separator 31 is removed through line 36 to stabilizer 37. In the preferred embodiment of the invention, the charge to fractionator 37 is split into a light fraction having an end-point in the range of about 220 to 280° F., which is taken overhead through line 38 to fractionator 39. A heavy reformate cut, having an initial boiling point in the range of about 220 to 275° F., is withdrawn as a product for blending through line 40. In second fractionator 39, hydrocarbons lighter than $C_6$ are separated as overhead through line 41, and the $C_6+$ cut is withdrawn as bottoms through line 42 for charging to extraction column 43. When the separation of a high quality heavy reformate by simple fractionation in fractionator 37 is not feasible, or is not desired, the column may be operated, for example, as a stabilizer withdrawing light hydrocarbons through valved overhead connection 38a. The remaining material then can be charged directly to extraction column 43 by means of valved connection 40a and line 42. This flow, however, is merely diagrammatic because with most feed stocks, it would be desirable to cut out the heaviest ends from the charge to the solvent extraction unit.

In the solvent extraction unit, a solvent selective for aromatics, e.g., ethylene glycol, is introduced near the top of column 43 as by line 44. An extract phase containing solvent plus dissolved aromatics is removed from the bottom of column 43 through line 45 to stripper 46. The extract product is recovered by steam stripping in stripper tower 46 and is removed overhead through line 47. A water stream from the steam condensate can be returned to column 43 to promote solvent selectivity therein as indicated by connection 48. The extract can be redistilled or washed with water to remove traces of solvent prior to blending with the heavy reformate product or use for other purposes. The recovered solvent is removed from the bottom of stripper 46 through line 49 to recycle through line 44. The raffinate, recovered overhead, is recycled to the reformer through line 50.

In an example of operation according to the invention, the average pressure on the reforming system is 300 p.s.i.g., the space velocity is 1.0 weight of fresh feed per hour per weight of catalyst, and the recycle rate is 5,000 s.c.f. of hydrogen per barrel of feed. The feed is preheated to a temperature of 900° F. in heater 11, and the recycle hydrogen is heated to a temperature of 1025° F. in heater 34, providing a reactor inlet temperature of 940° F. The outlet temperature of reactor 14 is 800° F. The reaction mixture is reheated in interheater 16 to a temperature to provide an inlet temperature to reactor 17 of 940° F. The outlet temperature is 880° F. In similar fashion, the feed streams to the remaining reactors are reheated to obtain inlet temperatures of 940° F. The outlet temperatures for reactors 20, 24 and 28 are, respectively, 910°, 925° and 930° F.

The effluent from reactor 28 is cooled to obtain a temperature of 100° F. in separator 31 at 280 p.s.i.g. The octane number of the usual $C_5+$ reformate obtained from the South Texas charge naphtha is 100 CFRR clear under the above reaction conditions. With a reformate of this quality, a heavy reformate having an initial boiling point of 225° F., and having an extrapolated octane number of 105 CFRR clear, comprising about 55 volume percent of the product, is recovered in product line 40. The $C_6+$ fraction, boiling in the range of 150 to 225° F. which is recovered as bottoms from fractionator 39, comprises about 35% of the total reformate and has an octane number of about 78 to 80 CFRR clear.

In solvent extraction unit 43, the $C_6+$ fraction is contacted with diethyleneglycol solvent at a solvent to oil ratio of 6:1, 300° F. and 150 p.s.i.g. The selectivity of the system can be adjusted as desired, but in the example about 60% of the $C_6+$ fraction is recovered as a paraffinic raffinate having an octane number of about 60 CFRR for recycle to the dehydrocyclization stage of the system. About 40% is recovered as 102 CFRR (extrapolated) extract.

In the operation of the invention, three or more reactors can be used in the reforming zone. In the case of three reactors, the first reactor constitutes the dehydrogenation section. In the case of a greater number reactors, the first two reactors will usually constitute the dehydrogenation stage. The conditions in the dehydrogenation stage approximate 750 to 900° F. average temperature, with a space velocity based on fresh feed for a 1:1 recycle ratio of about 0.1 to 3 WHSV. The temperature in the cyclization zone will approximate 900 to 1,000° F. The pressure may be in the range of 100 to 500 p.s.i.g. (preferably 150-300), and the hydrogen recycle rate in the range of about 2,000 to 10,000 s.c.f. per barrel. The recycle ratio of cycle oil to fresh feed may be in the range of about 0.2 to 2 or more, but preferably is about 0.3 to 1. An extraneous paraffinic oil can be added, if desired, as cycle oil make-up.

The catalyst may comprise any of the platinum type reforming catalysts, preferably on an alumina type base, although other supports, such as deactivated silica-alumina, alumina-titania, and the like, may be used. The presence of chlorine or fluorine, in known manner, may be desired in the reforming zone.

Although the drawing illustrates only the hydrocarbon flow, it will be understood that the system should be equipped for catalyst regeneration and/or rejuvenation. In the regeneration step, carbon is burned off the partially deactivated catalyst with a dilute oxygen containing gas. Higher oxygen partial pressures and severities are used in rejuvenation of more severely deactivated catalysts. The regeneration may be effected periodically in blocked-out operations, or it may be effected in the manner of Ultraforming by use of a swing reactor as has been described in the technical literature.

The cut point in the fractionation section depends upon the severity of reforming, the feed stock and the desired product octane. With $C_7+$ charge naphthas at severity levels producing 100 octane product, the $C_7$ aromatics should be included in the heavy reformate. An initial boiling point in the range of about 225 to 250° F. is recommended. At lower severities or with more refractory feeds, the initial of the heavy reformate may be in the range of about 250 to 275° F.

A variety of extractive agents can be used in the solvent extraction for treating the light reformate. Polyhydroxy solvents such as diethyleneglycol, dipropyleneglycol, triethyleneglycol, or mixtures thereof, advantageously promoted in selectivity by the addition of water, are particularly suitable. Other useful solvents are described in U.S. Patent 2,365,517. A newer solvent, butyrolactone, has certain advantages for processing reformates. Sulfur dioxide also is feasible although it requires added facilities for refrigerated handling of the solvent. Usually, the feed and solvent will be contacted countercurrently in one or more extraction columns of the number of theoretical extraction stages required to effect the degree of separation desired. The conditions of extraction will be determined by the nature of the solvent and its selectivity for aromatics at various temperature conditions. Usually, selectivity is improved with decreasing temperatures, and temperatures in the range of say −40° F. to 300° F. or more may be used, with adjustment of pressure to obtain the desired phase separation, at solvent to feed ratios advantageously in the range of 1/1 to 25/1. Various methods may be used to separate extract and solvent, but, in general, distillation is most satisfactory. Traces of solvent can be removed from the separated raffinate and extract phases by washing with water or other solvents, or by stripping.

The invention has the advantage of improving barrel-octanes at any given severity by introducing greater selectivity into the conduct of the various reforming reactions, or conversely, of reducing catalyst severity for any given product octane. The difficult cyclization of paraffins is promoted in rate by decreasing the concentration of naphthenes in the reaction zone. Thus, injection of the raffinate has the advantage of reducing the effective concentration of naphthenes to a very low level. Also, more selective handling of the hydrocarbons in the feed is possible since greater advantage is taken of the different conditions obtaining through a series of reforming reactors by injecting the paraffinic raffinate to the latter reactors. These results are accomplished in an economical manner since only the reactors, in which cyclization is active, are enlarged to accommodate the increase in charge because of recycle. In the operating example above, where the recycle is charged to the last three reactors of the series, the saving over the case in which the recycle oil is passed through the entire reactor train amounts to about two-fifths of the extra catalyst required to process the recycle stream. In addition, substantial savings because of reduced equipment size are also provided.

I claim:

1. A process for producing ultra-high octane gasoline blending stocks from low octane hydrocarbons, which process comprises charging to a dehydrogenation stage a mixture of at least a portion of a hereinafter described hydrogen-rich recycle gas and a low octane hydrocarbon naphtha, said stage comprising at least one dehydrogenation zone and being characterized by a temperature drop across each zone of said stage in the range of between about 60° F. to about 150° F., and being further characterized by the conversion of naphthenes to aromatics, said stage being maintained at an average temperature in the range of between about 750° F. to about 900° F., forming a mixture consisting of the effluent from said stage and at least a portion of a hereinafter described paraffin-rich raffinate, heating and charging said mixture to a subsequent dehydrocyclization stage comprising a series of dehydrocyclization zones, heating and charging the effluent from the first dehydrocyclization zone to a second dehydrocyclization zone in said dehydrocyclization stage, said dehydrocyclization stage being characterized by a temperature drop across each zone of said stage of less than about 50° F., and being further characterized by conversion of paraffins to aromatics, said dehydrocyclization stage being maintained at an average temperature within the range of between about 900° F. to 1000° F., each of said stages containing platinum-alumina catalyst and being maintained at a combination of conditions comprising, in addition to said temperatures, pressures in the range of between about 100 to 500 p.s.i.g., recycle gas rates in the range of between about 2,000 to 10,000 s.c.f./b. and weight hourly space velocities in the range of between about 0.1 to 3, providing thereby a severity sufficient to produce from the dehydrocyclization stage effluent a reformate having a $C_5+$ octane number of at least about 95 CFR–R (clear), separating from the dehydrocyclization stage effluent a hydrogen-rich recycle gas, and a liquid reformate, fractionating said liquid reformate into a light fraction boiling below about 150° F., a middle fraction boiling within the range of between 150° F. to about 280° F., and a heavy fraction, said heavy fraction boiling above said middle fraction and boiling within the range of between an initial boiling point of about 225 to 280° F. to the end point of said reformate and containing at least about 85 volume percent aromatics and having an octane number of at least about 100 CFR–R (clear), separating from said middle fraction by solvent extraction a paraffin-rich raffinate and an aromatic-rich extract, and obtaining an ultra-high octane number gasoline blending stock by combining said extract with said heavy fraction.

2. The process of claim 1 wherein said dehydrogenation stage comprises two zones and wherein the effluent from the first zone of said stage is heated and charged to a second zone in said stage.

References Cited in the file of this patent

UNITED STATES PATENTS

| | | |
|---|---|---|
| 2,697,684 | Hemminger et al. | Dec. 21, 1954 |
| 2,736,684 | Tarnpoll | Feb. 28, 1956 |
| 2,768,126 | Haensel et al. | Oct. 23, 1956 |
| 2,781,298 | Haensel et al. | Feb. 12, 1957 |
| 2,838,582 | Kassel et al. | June 10, 1958 |
| 2,865,837 | Holcomb et al. | Dec. 23, 1958 |